US009281942B2

(12) United States Patent  
Leboeuf et al.

(10) Patent No.: US 9,281,942 B2  
(45) Date of Patent: Mar. 8, 2016

(54) PASSWORD ENCRYPTION FOR CONTROLLING ACCESS TO ELECTRONIC CONTROL UNITS

(71) Applicant: GM Global Technology Operations LLC, Detroit, MI (US)

(72) Inventors: Karl B. Leboeuf, Windsor (CA); Joseph E. Ploucha, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/204,178

(22) Filed: Mar. 11, 2014

(65) Prior Publication Data

US 2015/0263856 A1    Sep. 17, 2015

(51) Int. Cl.  
*H04L 9/08* (2006.01)

(52) U.S. Cl.  
CPC ........... *H04L 9/0866* (2013.01); *H04L 2209/84* (2013.01)

(58) Field of Classification Search  
CPC .................................................... H04L 9/0866  
USPC ........................................................ 713/184  
See application file for complete search history.

(56) References Cited

U.S. PATENT DOCUMENTS

| 6,141,760 A * | 10/2000 | Abadi et al. ..................... 726/14 |
| 2006/0059109 A1 * | 3/2006 | Grimes .......................... 705/72 |
| 2007/0174614 A1 * | 7/2007 | Duane et al. .................. 713/168 |

OTHER PUBLICATIONS

B. Kaliski (RFC 2898, Sep. 2000, 34 pages).*  
Akgun et al. (New Results on the Key Scheduling Algorithm of RC4, INDOCRYPT 2008, LNCS 5365, pp. 40-52, 2008).*  
Kerma (ECU serial number, 6 pages. Oct. 2013, retrieved from VW TDI forum, Audi, Porsche, and Chevy Cruze diesel forum on Apr. 29, 2015).*

* cited by examiner

*Primary Examiner* — Saleh Najjar  
*Assistant Examiner* — Oleg Korsak  
(74) *Attorney, Agent, or Firm* — Christopher DeVries; Reising Ethington P.C.

(57) ABSTRACT

A method of providing access to a password-protected electronic control unit (ECU) using encryption includes generating a cryptographic key for the ECU using a master password, a serial number of the ECU, and a password-based key derivation function; converting the generated cryptographic key into an ECU password; and accessing data from the ECU using the ECU password.

20 Claims, 4 Drawing Sheets

US 9,281,942 B2

PASSWORD ENCRYPTION FOR CONTROLLING ACCESS TO ELECTRONIC CONTROL UNITS

TECHNICAL FIELD

The present invention relates to cryptographic techniques for controlling electronic access to electronic control units (ECUs) within a vehicle or other machine or device.

BACKGROUND

Many vehicles and other devices include electronic control units (ECUs) that govern a variety of tasks. The ECUs can be programmed to execute computer-readable instructions and control mechanical and/or electrical devices based on those instructions. For example, a powertrain control module (PCM) can act as a central decision making authority for the powertrain of a vehicle and take the form of an ECU to carry out that purpose. A number of vehicle engine parameters can be controlled by the PCM, such as ignition timing of an internal combustion engine (ICE) or an exhaust gas recirculation (EGR) valve to name a few.

The manufacturers of the vehicles or devices may wish to regulate access to the instructions or other operating aspects of the ECUs. Using the example above, a vehicle manufacturer may wish to limit access to the instructions and other features of the ECU to authorized individuals. In the past, access to the ECUs has been granted or denied using a password. However, a large number of ECUs commonly use one password and if the password is discovered for one ECU such a discovery can render all other ECUs using that password unprotected as well.

SUMMARY

According to an embodiment, there is provided a method of providing access to a password-protected electronic control unit (ECU) using encryption. The method includes generating a cryptographic key for the ECU using a master password, a serial number of the ECU, and a password-based key derivation function; converting the generated cryptographic key into an ECU password; and accessing data from the ECU using the ECU password.

According to another embodiment, there is provided a method of regulating access to an electronic control unit (ECU) using encryption. The method includes electronically receiving a master password from a central facility; detecting a serial number of the ECU; providing the master password and the serial number to a password-based key derivation function; outputting a cryptographic key based on the master password and the serial number; and converting the cryptographic key into an ECU password.

According to yet another embodiment, there is provided a method of providing unique passwords for a plurality of electronic control units (ECUs) using a master password common to the ECUs. The method includes producing a plurality of vehicle system modules for vehicles, wherein the vehicle system modules have a common vehicle part number and a serial number that is unique to each of the vehicle system modules; generating an ECU password for each vehicle system module using the serial number unique to that vehicle system module and a master password associated with the common vehicle part number; and storing the generated ECU password in each vehicle system module.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
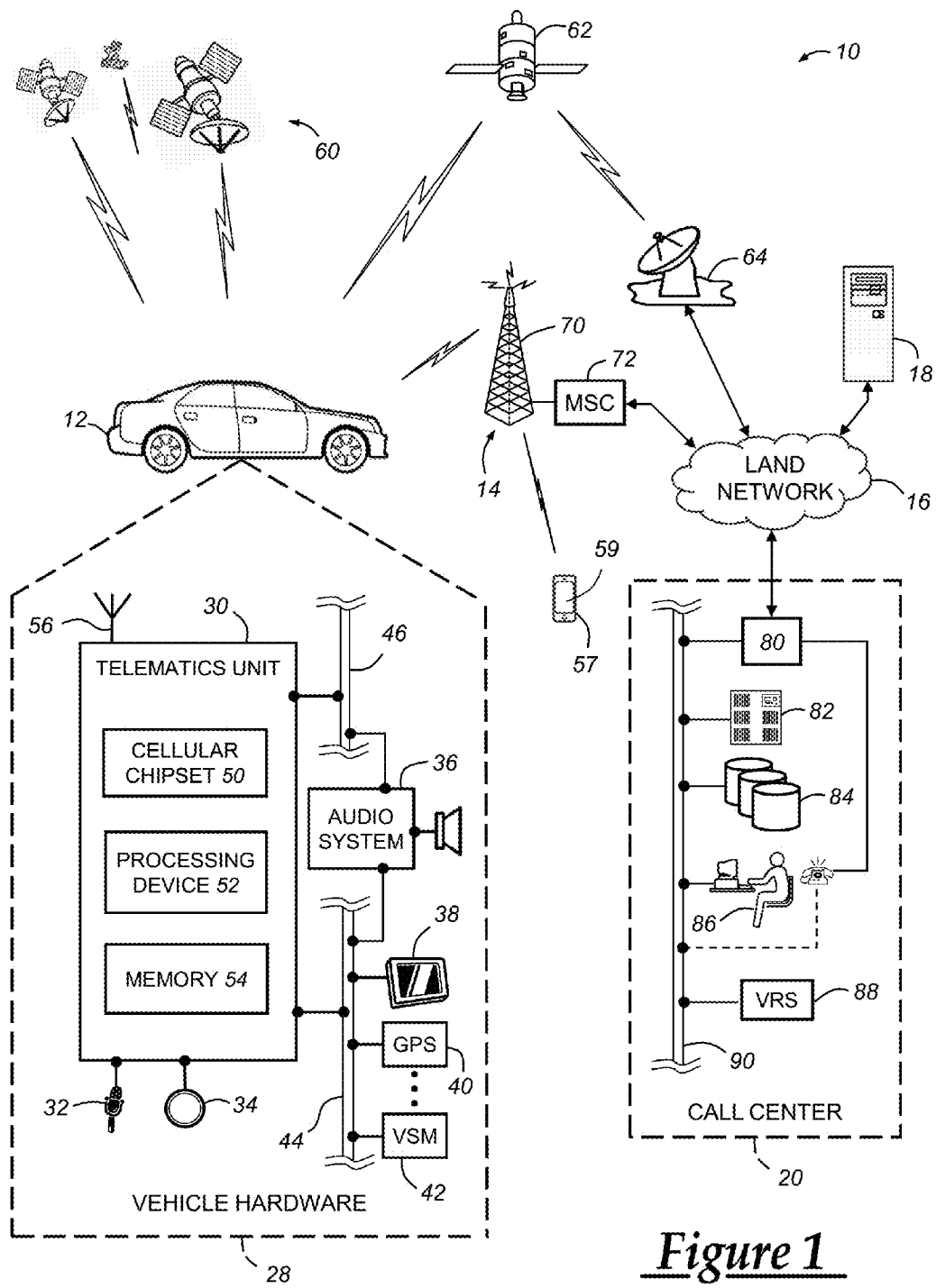
FIG. 1 is a block diagram depicting an embodiment of a communications system that is capable of utilizing the method disclosed herein.

The system and method described below involves electronic control units (ECUs) that can be encrypted using both a master password and a serial number of a particular ECU. The master password along with the serial number (acting as a salt) can be input into a password-based key derivation function (PBKDF), which outputs an encryption key based on both the master password and the serial number. The encryption key can then be converted into an ECU password capable of being input into the ECU. Conversion can be carried out in a variety of ways, such as using a lookup table that will be discussed in more detail below. Once created, it is highly likely the ECU password will be unique to each ECU because each ECU password has been created using a different serial number.

Later, when a technician or other authorized person seeks to gain access to the ECU, they can re-create the ECU password by finding the serial number of the ECU and entering it along with the master password into the PBKDF. In one implementation, the master password can be secured at a central location such that authorized users transmit the serial number to the central location where it can be combined with the master password into the PBKDF to output the ECU password for a particular ECU. The ECU password can then be provided to the authorized user to gain access to the particular ECU. In this arrangement, the master password can be closely held and highly-secure relative to past systems that maintained a common or single master password for many devices such that discovery of the single master password resulted in access to all ECUs. Generating the ECU password using the PBKDF limits access to a particular ECU.

Moreover, the master password input into the PBKDF and used to ultimately generate an ECU password can be greatly strengthened relative to common master passwords that were used in the past for large numbers of ECUs and actually received by the ECU. ECUs are often limited by the amount of memory space available for password storage. The limited memory space, in turn, limits the size, and therefore the strength, of the password able to be received by the ECU. In one common implementation, the ECU is capable of receiving a password no larger than 8 bytes/64 bits. When a common master password is used with an ECU and implemented as 8 bytes, it may be easier to guess or otherwise discover than longer or larger passwords. However, the present system and method can implement a much longer and stronger master password that is used to ultimately generate an ECU password than would normally be directly accepted by the ECU itself. In one implementation, the master password can be 64 bits or greater. While the systems and methods disclosed herein are described with respect to a vehicle and the vehicle using ECUs, it should be appreciated that the system and method can also be applied to ECUs used in other settings as well. As used herein, the ECU can be an electronic device having a serial number and at least one of the following: a microcontroller/microprocessor, a transceiver, an analog sensor, an analog circuit, power regulating circuits, or a housing.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver.

Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. The computer 18 can also be implemented to program a plurality of ECUs or VSMs 42 that have or use ECUs. Such programming could be carried out at a manufacturing facility that assembles the VSM 42 or the vehicle 12 itself. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
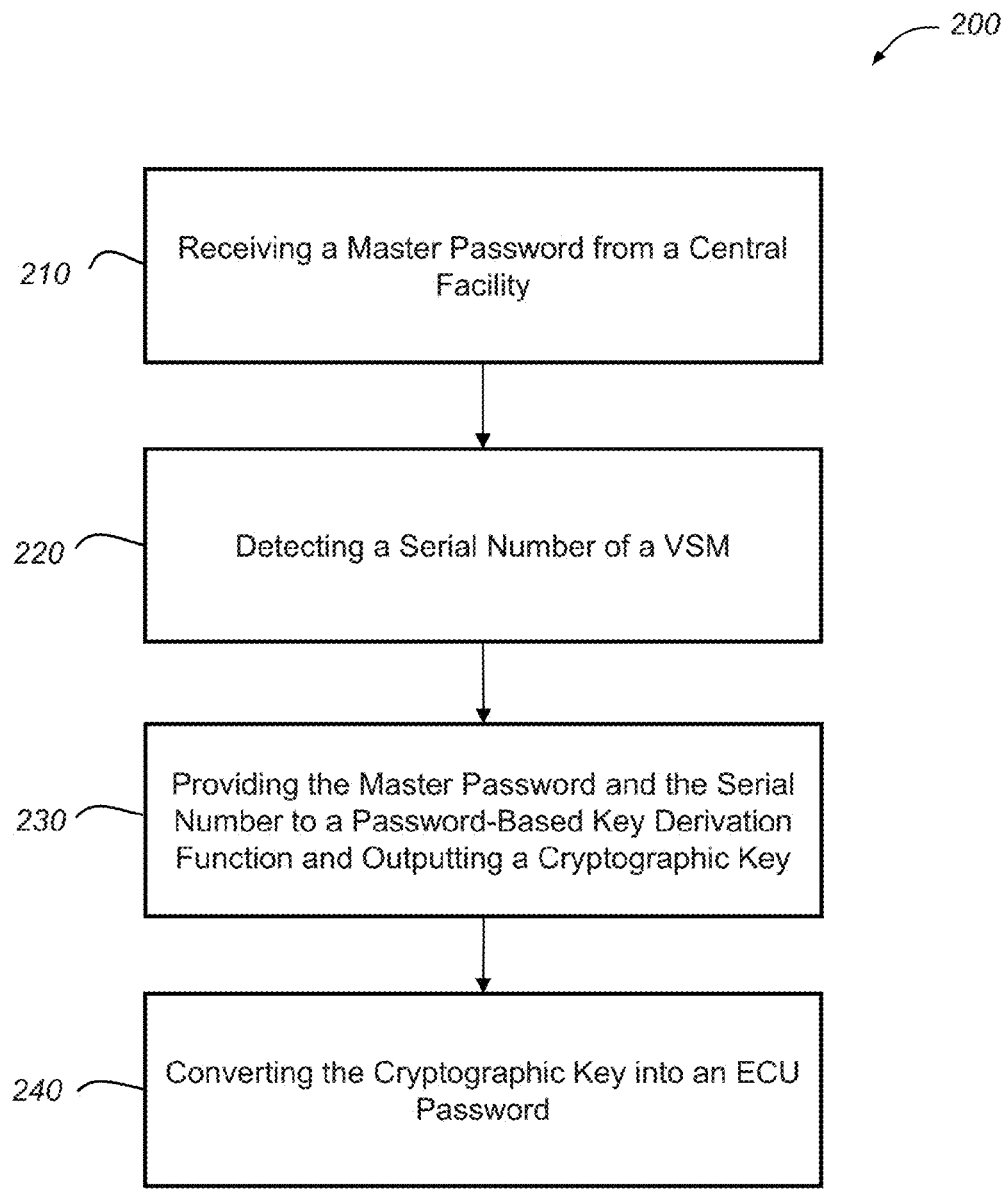
FIG. 2 is a flow chart depicting an embodiment of a method of regulating access to an ECU using encryption.

Turning now to FIG. 2, there is shown a method 200 of regulating access to an electronic control unit (ECU) using encryption. The method 200 begins at step 210 by electronically receiving a master password from a central facility. As noted above, ECUs are used in a variety of electronic devices. The method 200 is described with respect VSM 42 but it should be appreciated that aspects of the method 200 can be applied to electronic devices other than VSM 42. While the VSM 42 is being manufactured or installed in the vehicle 12, the ECU of the VSM 42 can be initially programmed with computer-readable instructions, such as firmware and other software, and also encoded with an ECU password. ECUs generally include computer processing capabilities including a clock, a memory device, and input/outputs (I/O) within a housing. One example of the ECU is the MPC 555 microprocessor manufactured by Motorola. The ECU password can be unique to each VSM 42 or to the ECU included with the VSM 42. This will be discussed in more detail below. To create the ECU password, a master password can be used that is assigned to a plurality of VSMs. For example, the VSM 42 can be assigned a vehicle part number that identifies the VSM 42 and other module having the same vehicle part number. The vehicle part number may be comprised of a plurality of serial numbers each uniquely representing different VSMs having one vehicle part number. Put differently, using a PCM as an example, two different PCMs can have a single vehicle part number but be distinguished by having different serial numbers.

The master password can be chosen carefully based not only on the number of characters included with the master password, but also the character set from which the characters are chosen and how those characters are encoded. The character set can be described as a collection of symbols that make up the master password. For instance, the character set used for numeric passwords are the Arabic numerals from zero to nine. Character encoding can be implemented in a variety of ways as different schemes are available for encoding characters into binary data. These schemes include ASCII, UTF-8, UTF-16, UTF-32, ISO 8859, as well as others. In this implementation, characters can be encoded using UTF-8, which is backwards compatible with (traditionally encoded) ASCII. In UTF-8, characters are encoded as 8-bit codes: one character per byte.

A character lookup table (CLT) can provide UTF-8 character codes to be accessed from an index. A table is provided below, which is populated such that the '0' index value refers to the least significant UTF-8 character code in the character set, with the next higher UTF-8 character codes occupying ascending table indices. An example is shown in a CLT table below for the character set {a, b, c, A, B, C, 1, 2, 3}. The number of rows in the table is equal to the number of characters in the character set, and the number of bytes required to address the table is $L_{Index}=[\log_{256}N_{charset}]$, where [ ] denotes a value rounded up to the nearest integer. Using the nine characters of the character set, it will take 0.396 bytes to address the table, which rounds up to 1.

| Index | Character | UTF-8 Code (hexadecimal) |
|---|---|---|
| 0 | 1 | 0 × 31 |
| 1 | 2 | 0 × 32 |
| 2 | 3 | 0 × 33 |
| 3 | A | 0 × 41 |
| 4 | B | 0 × 42 |
| 5 | C | 0 × 43 |
| 6 | a | 0 × 61 |
| 7 | b | 0 × 62 |
| 8 | c | 0 × 63 |

The strength of the master password can be defined as the minimum number of binary bits it would take to represent all possible values the master password could be composed from. For example, a 3-digit PIN has 1,000 different combinations (000 through 999), and the password strength can be calculated as: strength=$\log_2 1000$ Therefore, 3-digit PINS have a strength of about 10 bits (9.96). However, it is worth noting that password strength may be significantly less than the number of bits required to encode the value of the password itself. For example, when using UTF-8 encoding, 8 bits are used for each character, which means each character in a password could be one of $2^8=256$ values. In some implementations, the character set may be limited to characters that can be typed in with a keyboard. Each character in a password normally has fewer that the 256 possible values; 10 for numbers only, and 62 for numbers and upper/lower case letters. Using the 3-digit PIN example above, it has 1,000 possible combinations. When encoding the PIN using the UTF-8 standard that encodes each character with 8 bits, a total of 24 bits would be needed to encode this information. The number of bits used to encode the PIN is different than the password strength, which is 10 bits.

In this implementation, the master password uses 64 bits of strength. The minimum password length of a password with 64-bits of security, $L_{PW}$, depends on the size of the passwords' character set. Specifically, $$L_{PW} = \left\lceil \frac{64}{\log_3 N_{charset}} \right\rceil$$

can represent the length of the master password where $N_{charset}$ is the number of characters in the master password's character set. The 64-bit measurement described here of the master password is the measure of password strength and not the buffer length. The following tables shows examples of the minimum master password lengths in characters used to meet the 64-bit password requirement given different character sets.

| Set name | $N_{charset}$ | LPW |
|---|---|---|
| Numbers | 10 | 20 |
| Lower or uppercase letters | 26 | 14 |
| Lower or uppercase letters, and numbers | 36 | 13 |
| Lower and uppercase letters and numbers | 62 | 11 |
| All printable ASCII characters | 95 | 10 |

Regardless of its form, a master password may be assigned to each vehicle part number and the master password can be stored at a central location. The central location can be the call center 20 or some other remote, back-office server, to give a few examples. Before the VSM 42 is installed in the vehicle 12, the master password can be communicated electronically from the central facility to the place of manufacture or installation. In one example, the central facility could be implemented by the servers 82 located at the call center 20. If the programming were to be carried out by computer 18, the master password can be electrically transmitted from the servers 82 through the land network 16 to computer 18. But it should be understood that the master password can be conveyed in other ways as well, such as by a computer-readable medium (e.g., a flash drive) or wirelessly via the wireless carrier system 14. The method 200 proceeds to step 220.

At step 220, a serial number of the VSM 42 using the ECU is detected. As part of creating the ECU password, the computer 18 can detect the serial number of the VSM 42. For example, the computer 18 can be electrically or communicatively linked with an optical scanner (not shown) that reads the serial number from an exterior surface of the VSM 42 and converts the serial number into data representing the numerical, alphabetical, or other characters comprising the serial number. In another example, the computer 18 can be electrically or communicatively linked with the VSM 42 and using a computer instruction can access the serial number that has been stored in a memory device at the VSM 42. In one implementation, the memory device can be carried by the ECU itself. Once the computer 18 has obtained the master password for the VSM 42 and the serial number of the VSM 42, the method 200 proceeds to step 230.

At step 230, the master password and the serial number are provided to a password-based key derivation function (PBKDF) and a cryptographic key is output based on the master password and the serial number. PBKDFs are key derivation functions that can input a number of variables and output a key that is derived from those variables. The input variables include a password, a salt, a number of iterations, and an output length for a derived key (DK). Here, the master password is used for the password variable, while the serial number of the VSM 42 is used for the salt. The master password is usually some amount of information that a human can interpret and understand, and a cryptographic key output by the PBKDF can be some amount of information that is employed by a cryptographic primitive, such as block ciphers (e.g. AES). One difference between the master password and the DK output by the PBKDF is that passwords are not usually suitable for direct use as keys for cryptographic primitives such as block ciphers. For example, consider a master password selected from numbers, as well as upper and lower case letters—a total of 62 characters—and used for an AES-128 block cipher. The strength of AES-128 is 128 bits, and so a master password having the same strength should be used. With a 62-element character set, it can be calculated that a total of $\log_{62}(2^{128}) \approx 22$ characters may be included with the master password when using the PBKDF to output a key used for an AES-128 block cipher. If the master password is encoded with UTF-8, it will be 22×8=176 bits long. However, AES-128 needs a key that is exactly 128 bits in length so word based master passwords are not the same as the DK.

In one implementation, the PBKDF can be carried out using the password based key derivation function 2 (PBKDF2) as defined in RFC2898, section 5.2 [1] that is published by the Internet Engineering Task Force (IETF), to generate the key when given the master password and the ECU serial number. The pseudo-random function (PRF) HMAC-SHA256 can be used and the iteration count may be obtained from a variable, $i_{count}$, which can be initialized to 10,000. The output length of the derived key, dkLen, may be defined as the product of the master password length (in this case 64 bits in length) and the minimum number of bytes ($L_{index}$) needed to address the CLT plus one:

$$dkLen \geq 2L_{PW} \times (L_{index}+1)$$

The '+1' in the above equation can be used to reduce the probability that the output of the PBKDF function produces a modulo bias. The key that is output from the PBKDF can be placed in an array (DK) of length dkLen bytes. The method 200 proceeds to step 240.

At step 240, the cryptographic key can then be converted into an ECU password. Before doing so, the output or derived cryptographic key can be analyzed to identify any biasing in the key. In one example, conversion can be implemented using a modulus operator that translates the cryptographic key into characters of the character set. The modulus operator can convert the cryptographic key output into the character set in a way similar to the operation of a clock. As the clock moves from one hour to the next, this movement is linear and periodic. In one illustrative example, if one began recording hour values beginning at one o'clock over a large period of time, regardless of how much time passed the hour hand on the clock will always be some value between 1 and 12. In contrast, biasing can occur when the random amount of time has a maximum value that is not an integer multiple of 12. In those cases, some numbers have a higher probability of occurring than other numbers. Therefore, in some implementations the cryptographic key can be analyzed for biasing before conversion into the ECU password. Like the clock example above, the encryption key can be checked to see if there is some bias to the output key. If so, then the key can be thrown out, the number of iterations ($i_{count}$) can be increased, and the key can be re-generated and checked again for bias.

In another embodiment, the creation of the ECU passwords can be simplified by choosing a character set whose length evenly divides the number of distinct values that can be represented by $L_{PW}$ bytes. In particular, the modulo bias checks can be completely removed. Such an implementation can eliminate the need for a '+1' byte to be added to the $L_{index}$ length, as well as the need for reformatting the string of derived key material, DK; instead DK is converted directly to $PW_{out}$, byte-for-byte, by simply computing:

$$PW_{out}[i]=DK[i] \bmod (N_{charset})$$

Figure 3:
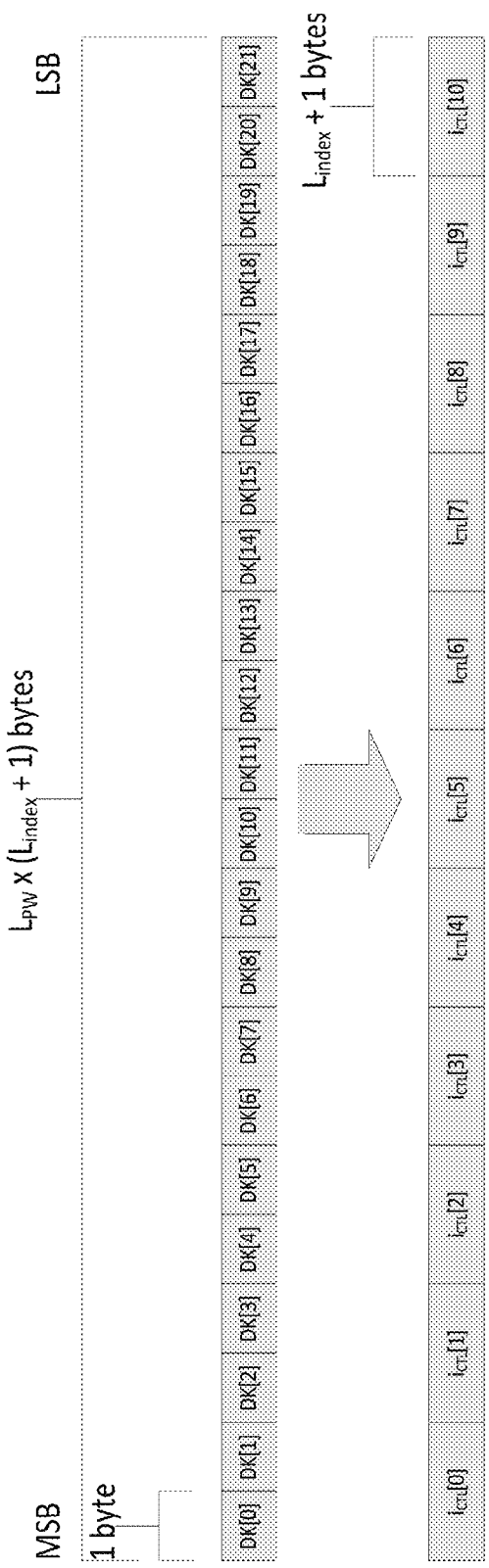
FIG. 3 is a chart depicting an embodiment of a cryptography key array and an ECU password array.

Once the cryptographic key has passed its check for bias, the DK string can be parsed into an integer array labeled $i_{CTL}$. The $I_{CTL}$ array may have a length of $L_{PW}$ and each entry in the array can use $L_{index}+1$ bytes from the DK string. Such an arrangement is shown graphically in FIG. 3. The example shown in FIG. 3 depicts a 64-bit master password that uses an $N_{charset}$ of 62, (which corresponds to upper and lower case characters and numbers), $L_{index}$ of 1, and $L_{PW}$ equal to 11. Note that the array is in Big-Endian format in which the most-significant byte is stored in the smallest address. However, it should be appreciated that such a format is not necessary and other formats are possible.

The $i_{CTL}$ array's values modulo ($N_{charset}$) are used with the CTL to obtain the characters, in Big Endian order, in a derived password string, $P_{Wout}$:

$$PW_{out}[i]=i_{CTL}[i] \bmod (N_{charset})$$

To convert the cryptographic key—in this case included in the DK array—into the ECU password, represented by the $i_{CTL}$ array, a modulo operator governing the character set can be used to assign elements of the character set to each value in the DK array. The ECU password can then be written into a memory portion of the VSM 42 and/or the ECU carried by the VSM 42.

Once the ECU password has been created, it does not need to be stored in a central database. Instead, the master password can be used to create the ECU password for any VSM having a common vehicle part number using the PBKDF when needed. In one example of how this can be done, a technician may want access to the VSM 42. He or she can read the serial number on the VSM 42 and provide that serial number into a web portal or to an advisor at the call center 20. The ECU password for the particular VSM 42 can then be generated at a location remote from the technician using the master password and the PBKDF. Once the ECU password is generated, it can be electronically transmitted to the technician via the wireless carrier system 14 and/or the land network 16. That way, access to the master password is significantly limited. And the ECU password for the VSM 42 is not valid for other VSMs having the same vehicle part number. The method 200 then ends.

Figure 4:
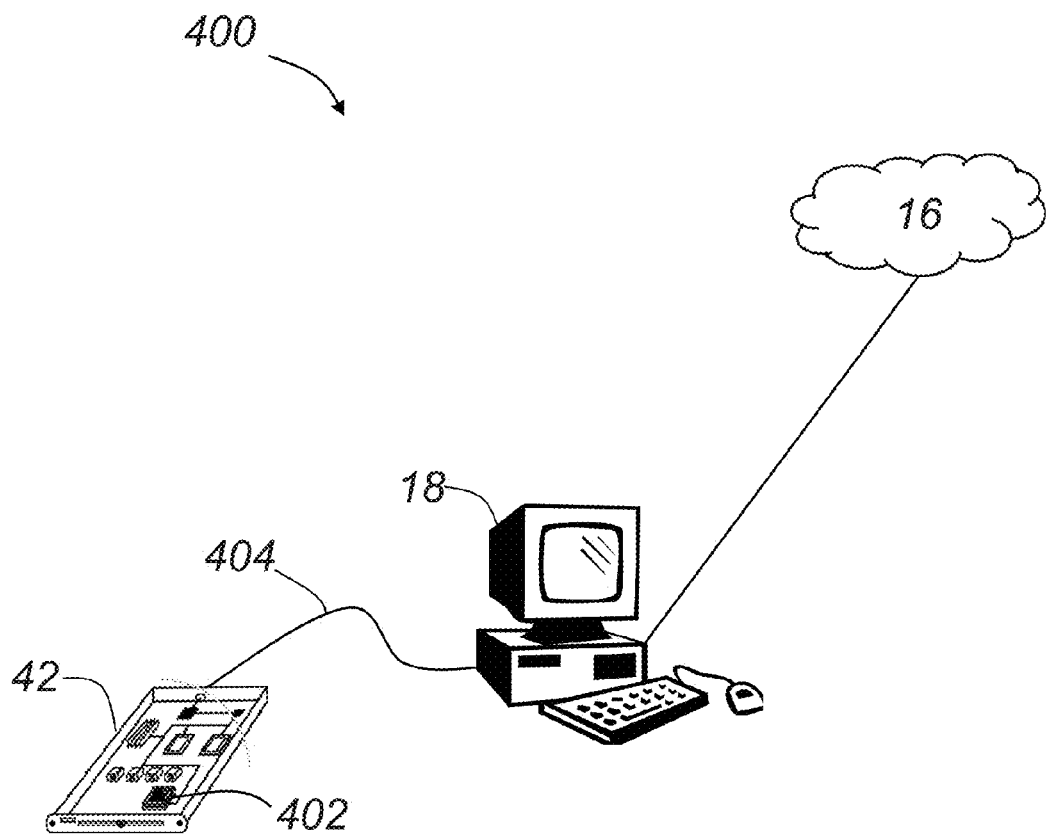
FIG. 4 is a depiction of an embodiment of a method of combining key material output from a password-based key derivation function into an array.

Turning to FIG. 4, a system 400 is shown for regulating access to the ECU 402 of the VSM 42 using encryption. In the system 400, the computer 18 can receive the master password from a remotely located central facility via the land network 16. The computer 18 can then be communicatively linked to the VSM 42 using, in this example, a wire 404. The computer 18 can obtain the serial number for the VSM 42 and generate the ECU password as described above with regard to FIGS. 2-3. After doing so, the computer 18 can write the ECU password to a memory portion of the ECU 402 where the ECU password is stored. In some implementations, writing the ECU password to the memory portion of the ECU can destroy a fusible link thereby preventing changes to the stored ECU password.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing access to a password-protected electronic control unit (ECU) using encryption, comprising the steps of:
   (a) generating a cryptographic key for the ECU using a master password, a serial number of the ECU, and a password-based key derivation function, wherein the cryptographic key is suitable for direct use by a cryptographic primitive;
   (b) converting the generated cryptographic key into an ECU password; and
   (c) accessing data from the ECU using the ECU password.

2. The method of claim 1, wherein a length of the master password is chosen based on a character set size.

3. The method of claim 1, further comprising the step of associating a vehicle part number with the master password.

4. The method of claim 1, wherein the password-based key derivation function is defined in request for comment (RFC) 2898 published by the Internet Engineering Task Force.

5. The method of claim 1, further comprising initiating a counter of the password-based key derivation function at a value greater than 1000.

6. The method of claim 1, wherein the master password is greater than or equal to 64 bits.

7. The method of claim 1, further comprising converting the generated cryptographic key into the ECU password using a modulo operator.

8. The method of claim 1, further comprising the step of analyzing the cryptographic key for bias.

9. The method of claim 1, further comprising the step of reducing a probability of a modulo bias by using one or more additional bytes of key material output from the password-based key derivation function.

10. The method of claim 1, further comprising the steps of:
    receiving the serial number from a user;
    generating the ECU password from the received serial number and the master password at a location remote from the user; and
    transmitting the ECU password to the user.

11. A method of regulating access to an electronic control unit (ECU) using encryption, comprising the steps of:

(a) electronically receiving a master password from a central facility;
(b) detecting a serial number of the ECU;
(c) providing the master password and the serial number to a password-based key derivation function;
(d) outputting a cryptographic key based on the master password and the serial number; and
(e) converting the cryptographic key into an ECU password.

12. The method of claim 11, wherein a length of the master password is chosen based on a character set size.

13. The method of claim 11, further comprising the step of associating a vehicle part number with the master password.

14. The method of claim 11, wherein the password-based key derivation function is defined in request for comment (RFC) 2898 published by the Internet Engineering Task Force.

15. The method of claim 11, further comprising initiating a counter of the password-based key derivation function at a value greater than 1000.

16. The method of claim 11, wherein the master password is greater than or equal to 64 bits.

17. The method of claim 11, further comprising the step of analyzing the cryptographic key for bias.

18. The method of claim 11, further comprising the steps of:
receiving the serial number from a user;
generating the ECU password from the received serial number and the master password at a location remote from the user; and
transmitting the ECU password to the user.

19. The method of claim 11, further comprising the step of writing the ECU password to memory of the ECU.

20. A method of providing unique passwords for a plurality of electronic control units (ECUs) using a master password common to the ECUs, comprising the steps of:
(a) producing a plurality of vehicle system modules for vehicles, wherein the vehicle system modules have a common vehicle part number and a serial number that is unique to each of the vehicle system modules;
(b) generating an ECU password for each vehicle system module using the serial number unique to that vehicle system module and a master password associated with the common vehicle part number; and
(c) storing the generated ECU password in each vehicle system module.

* * * * *